(12) United States Patent
Wang et al.

(10) Patent No.: US 11,516,031 B2
(45) Date of Patent: Nov. 29, 2022

(54) POWER-OVER-ETHERNET (POE) DEVICE AND POE SYSTEM USING THE SAME

(71) Applicant: FLYTECH TECHNOLOGY CO., LTD., Taipei (TW)

(72) Inventors: Jian-Jia Wang, Taipei (TW); Shih-Hsuan Lin, Taipei (TW); Li-Wei Chu, Taipei (TW); Li-Chun Chou, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/459,898

(22) Filed: Aug. 27, 2021

(65) Prior Publication Data

US 2022/0329447 A1  Oct. 13, 2022

(30) Foreign Application Priority Data

Apr. 8, 2021 (TW) ................... 110112754

(51) Int. Cl.
*H04L 12/10* (2006.01)
*H04L 12/42* (2006.01)
*H01H 47/00* (2006.01)

(52) U.S. Cl.
CPC .............. *H04L 12/10* (2013.01); *H04L 12/42* (2013.01); *H01H 47/00* (2013.01)

(58) Field of Classification Search
CPC ......... H04L 12/10; H04L 12/42; H04L 25/00; H04L 25/02; H04L 25/026; H01H 47/00; H04B 3/54; H04B 3/548; H04B 3/56; H04B 2203/54; H04B 2203/5404; H04B 2203/5408; H04B 2203/5429; H04B 2203/545; H04B 2203/5462; H04B 2203/547; H04B 2203/5483; H04B 2203/5487; H04B 2203/5491; H04N 1/32; H04N 1/327; H04N 1/32704; H04N 1/32763

See application file for complete search history.

(56) References Cited

U.S. PATENT DOCUMENTS

| | | | | |
|---|---|---|---|---|
| 7,053,501 B1 * | 5/2006 | Barrass | ..................... | H02J 1/10 307/29 |
| 7,921,308 B2 * | 4/2011 | Dhuyvetter | ............. | H04L 12/10 713/300 |
| 8,013,466 B1 * | 9/2011 | Thompson | ................ | H02J 1/00 713/300 |
| 8,064,179 B2 * | 11/2011 | Apfel | ...................... | H04L 12/66 361/90 |
| 9,197,424 B2 * | 11/2015 | Schindler | ................ | H04L 12/10 |
| 9,295,142 B1 * | 3/2016 | Leinen | ................... | H05B 47/18 |

(Continued)

*Primary Examiner* — James M Perez
(74) *Attorney, Agent, or Firm* — Hamre, Schumann, Mueller & Larson, P.C.

(57) ABSTRACT

A PoE system includes a plurality of PoE devices and a hub that are coupled in a ring configuration through a plurality of network cables. The hub is coupled to two of the network cables, and provides electric power to at least one of the network cables that is coupled to the hub. Each of the PoE devices is coupled to two of the network cables, receives electric power from one of the two network cables, and supplies electric power to the other one of the two network cables. As a consequence, each of the PoE devices can be directly or indirectly powered by the hub.

8 Claims, 5 Drawing Sheets

(56) References Cited

U.S. PATENT DOCUMENTS

| | | | |
|---|---|---|---|
| 9,419,807 B2* | 8/2016 | Huff | H04L 12/10 |
| 9,448,604 B2* | 9/2016 | Chuang | H04L 12/10 |
| 9,729,081 B1* | 8/2017 | Zou | H02M 7/066 |
| 9,780,955 B2* | 10/2017 | Blaut | H04L 12/10 |
| 10,401,831 B2* | 9/2019 | Lam | G05B 19/0423 |
| 10,630,494 B2* | 4/2020 | LaBosco | H04L 12/40045 |
| 10,637,233 B2* | 4/2020 | Hao | H02H 1/0092 |
| 10,644,518 B2* | 5/2020 | Ting | H02J 7/0024 |
| 10,757,791 B1* | 8/2020 | Jonsson | H05B 47/185 |
| 2002/0002672 A1* | 1/2002 | Mouton | H04L 12/10 |
| | | | 709/200 |
| 2003/0072438 A1* | 4/2003 | Le Creff | H04L 41/06 |
| | | | 379/399.01 |
| 2004/0201931 A1* | 10/2004 | Korcharz | H02J 9/061 |
| | | | 361/18 |
| 2006/0218418 A1* | 9/2006 | Camagna | H04L 12/10 |
| | | | 713/300 |
| 2007/0147354 A1* | 6/2007 | He | H04L 12/10 |
| | | | 370/352 |
| 2007/0237322 A1* | 10/2007 | Hussain | H04L 12/40045 |
| | | | 379/413 |
| 2007/0263333 A1* | 11/2007 | Apfel | H02H 9/041 |
| | | | 361/91.1 |
| 2007/0278857 A1* | 12/2007 | Robbins | H02J 13/00016 |
| | | | 307/2 |
| 2007/0283173 A1* | 12/2007 | Webb | H04L 12/10 |
| | | | 713/300 |
| 2008/0054720 A1* | 3/2008 | Lum | H02J 1/10 |
| | | | 307/52 |
| 2008/0136256 A1* | 6/2008 | Gattani | H04L 12/66 |
| | | | 307/2 |
| 2008/0137759 A1* | 6/2008 | Cai | H04L 25/0298 |
| | | | 370/216 |
| 2008/0175260 A1* | 7/2008 | Hussain | H04L 12/66 |
| | | | 370/419 |
| 2008/0235523 A1* | 9/2008 | Hussain | G06F 1/266 |
| | | | 713/300 |
| 2008/0294918 A1* | 11/2008 | Dhuyvetter | H04L 12/10 |
| | | | 713/310 |
| 2010/0007334 A1* | 1/2010 | Apfel | H04L 12/10 |
| | | | 324/123 R |
| 2010/0145543 A1* | 6/2010 | Middlemiss | G06F 1/266 |
| | | | 700/295 |
| 2011/0283118 A1* | 11/2011 | Maniktala | G06F 1/266 |
| | | | 713/300 |
| 2013/0031378 A1* | 1/2013 | Schindler | H04L 12/413 |
| | | | 713/300 |
| 2013/0054724 A1* | 2/2013 | Yundt | H04L 12/40182 |
| | | | 709/208 |
| 2014/0084681 A1* | 3/2014 | Vigna | G06F 1/26 |
| | | | 307/12 |
| 2014/0111009 A1* | 4/2014 | Ruef | H04L 12/40013 |
| | | | 307/29 |
| 2014/0244881 A1* | 8/2014 | Stewart | G06F 13/409 |
| | | | 710/302 |
| 2014/0284997 A1* | 9/2014 | Wang | H04L 12/40045 |
| | | | 307/1 |
| 2015/0108962 A1* | 4/2015 | Chuang | H04L 12/10 |
| | | | 323/299 |
| 2015/0289405 A1* | 10/2015 | Stewart | G06F 13/409 |
| | | | 211/26 |
| 2015/0372826 A1* | 12/2015 | Blaut | H04L 12/10 |
| | | | 307/1 |
| 2016/0056967 A1* | 2/2016 | Ohana | H04L 12/10 |
| | | | 307/1 |
| 2016/0273722 A1* | 9/2016 | Crenshaw | H02J 9/065 |
| 2017/0041153 A1* | 2/2017 | Picard | H04L 12/10 |
| 2017/0170734 A1* | 6/2017 | Sheng | H02M 1/4258 |
| 2017/0338969 A1* | 11/2017 | Paul | H04L 12/10 |
| 2018/0063928 A1* | 3/2018 | Hick | H04L 12/40 |
| 2018/0210524 A1* | 7/2018 | Koenen | H04L 12/10 |
| 2019/0068071 A1* | 2/2019 | Jia | H02M 3/3376 |
| 2019/0190727 A1* | 6/2019 | LaBosco | G06F 1/266 |
| 2020/0244471 A1* | 7/2020 | LaBosco | H04L 12/12 |
| 2020/0294746 A1* | 9/2020 | Wang | H04L 12/10 |
| 2021/0013735 A1* | 1/2021 | Pachoud | G06F 1/189 |
| 2021/0135579 A1* | 5/2021 | Mandewalkar | H02M 7/06 |
| 2021/0281080 A1* | 9/2021 | Danielsen | H02J 9/06 |
| 2021/0344194 A1* | 11/2021 | Pachoud | H02G 15/113 |
| 2022/0021767 A1* | 1/2022 | Kasmir | H04M 11/025 |
| 2022/0236781 A1* | 7/2022 | Crenshaw | H05B 45/3725 |

* cited by examiner

POWER-OVER-ETHERNET (POE) DEVICE AND POE SYSTEM USING THE SAME

CROSS-REFERENCE TO RELATED APPLICATION

This application claims priority of Taiwanese Patent Application No. 110112754, filed on Apr. 8, 2021.

FIELD

The disclosure relates to power-over-Ethernet (PoE) techniques, and more particularly to a PoE device and a PoE system using the same.

BACKGROUND

Figure 1:
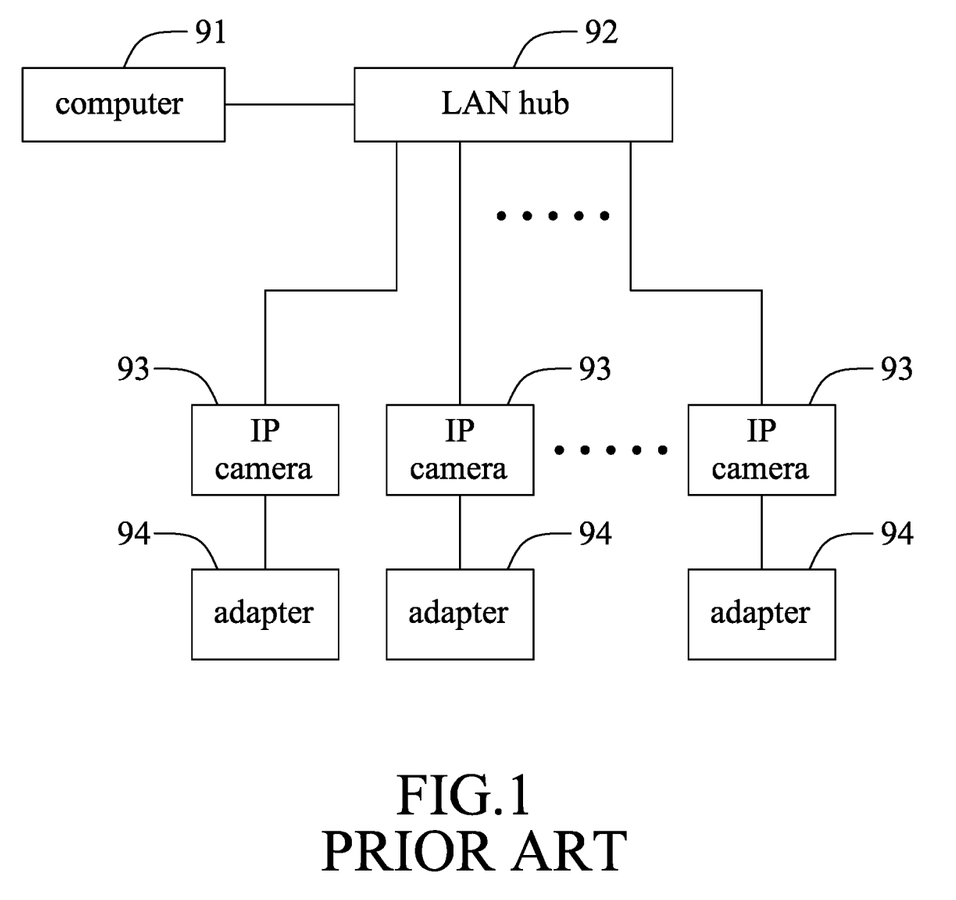
FIG. 1 is a block diagram illustrating a conventional security monitoring system.

Referring to FIG. 1, a conventional security monitoring system includes a computer 91, a local area network (LAN) hub 92 and multiple Internet Protocol (IP) cameras 93. The LAN hub 92 is coupled to the computer 91 and the IP cameras 93 through multiple LAN cables. Images captured by each of the IP cameras 93 are transmitted first to the LAN hub 92 and then to the computer 91. Electric power required for operation of each of the IP cameras 93 is supplied by a respective one of multiple adapters 94. It costs money to purchase the adapters 94 and labor is also required to wire the adapters 94 respectively to the IP cameras 93.

SUMMARY

Therefore, an object of the disclosure is to provide a power-over-Ethernet (PoE) device and a PoE system using the same. The PoE system can alleviate the drawback of the prior art.

According to an aspect of the disclosure, the PoE device includes a first interface, a second interface, a first switch, a second switch, a first rectifier, a second rectifier, a third rectifier, a fourth rectifier, a switch controller, a powered device (PD) controller, a third switch and a power sourcing equipment (PSE) controller. The first and second interfaces are adapted to be respectively coupled to a first network cable and a second network cable. The first switch has a plurality of first terminals that are coupled to the first interface, a plurality of second terminals, a plurality of third terminals, and a control terminal that is to receive a first control signal. The second switch has a plurality of first terminals that are coupled to the second interface, a plurality of second terminals, a plurality of third terminals, and a control terminal that is to receive a second control signal. Each of the first and second switches normally stays in a first state where the first terminals thereof are respectively coupled to the second terminals thereof, and, when being actuated by the corresponding one of the first and second control signals, stays in a second state where the first terminals thereof are respectively coupled to the third terminals thereof. The first rectifier is coupled to the first interface and the second terminals of the first switch. The second rectifier is coupled to the second interface, the second terminals of the second switch, and the first rectifier. The first rectifier, when receiving electric power from the first network cable through the first interface or through the first switch and the first interface, rectifies the electric power received by the first rectifier, and the second rectifier, when receiving electric power from the second network cable through the second interface or through the second switch and the second interface, rectifies the electric power received by the second rectifier, so that an input voltage is provided at a common node of the first and second rectifiers. The third rectifier is coupled to the second terminals of the first switch, and, when receiving electric power from the first network cable through the first switch and the first interface, rectifies the electric power received by the third rectifier to generate a first rectified voltage. The fourth rectifier is coupled to the second terminals of the second switch, and, when receiving electric power from the second network cable through the second switch and the second interface, rectifies the electric power received by the fourth rectifier to generate a second rectified voltage. The switch controller is coupled to the third and fourth rectifiers to receive the first and second rectified voltages, and is further coupled to the control terminals of the first and second switches. The switch controller generates the first and second control signals for receipt by the control terminals of the first and second switches and an enable signal based on the first and second rectified voltages. The PD controller is coupled to the common node of the first and second rectifiers to receive the input voltage, and is to output the input voltage to serve as a supply voltage that supplies electric power required for operation of the PoE device. The third switch has a first terminal that is coupled to the common node of the first and second rectifiers, a second terminal, and a control terminal that is coupled to the switch controller to receive the enable signal. Based on the enable signal, the third switch transitions between a conduction state, where the first and second terminals thereof are coupled to each other, and a non-conduction state, where the first and second terminals thereof are not coupled to each other. The PSE controller is coupled to the second terminal of the third switch and the third terminals of the first and second switches, is to receive the input voltage from the common node of the first and second rectifiers through the third switch, and is to output the input voltage to serve as an output voltage for receipt by the third terminals of each of the first and second switches. The switch controller, when determining that the PoE device receives electric power from the first network cable, generates the first and second control signals and the enable signal in such a way that the first switch, the second switch and the third switch respectively stay in the first state, the second state and the conduction state, so that the output voltage is generated, and supplies electric power to the second network cable through the second switch and the second interface. The switch controller, when determining that the PoE device receives electric power from the second network cable, generates the first and second control signals and the enable signal in such a way that the first switch, the second switch and the third switch respectively stay in the second state, the first state and the conduction state, so that the output voltage is generated, and supplies electric power to the first network cable through the first switch and the first interface.

According to another aspect of the disclosure, the PoE system includes a plurality of PoE devices and a hub that are coupled in a ring configuration through a plurality of network cables. The hub is coupled to two of the network cables, and provides electric power to at least one of said two of the network cables. Each of the PoE devices includes a first interface, a second interface, a first switch, a second switch, a first rectifier, a second rectifier, a third rectifier, a fourth rectifier, a switch controller, a PD controller, a third switch and a PSE controller. The first and second interfaces are respectively coupled to one and another one of the network cables. The first switch has a plurality of first terminals that are coupled to the first interface, a plurality of second terminals, a plurality of third terminals, and a control terminal that is to receive a first control signal. The second switch has a plurality of first terminals that are coupled to the second interface, a plurality of second terminals, a plurality of third terminals, and a control terminal that is to receive a second control signal. Each of the first and second switches normally stays in a first state where the first terminals thereof are respectively coupled to the second terminals thereof, and, when being actuated by the corresponding one of the first and second control signals, stays in a second state where the first terminals thereof are respectively coupled to the third terminals thereof. The first rectifier is coupled to the first interface and the second terminals of the first switch. The second rectifier is coupled to the second interface, the second terminals of the second switch, and the first rectifier. The first rectifier, when receiving electric power from said one of the network cables through the first interface or through the first switch and the first interface, rectifies the electric power received by the first rectifier, and the second rectifier, when receiving electric power from said another one of the network cables through the second interface or through the second switch and the second interface, rectifies the electric power received by the second rectifier, so that an input voltage is provided at a common node of the first and second rectifiers. The third rectifier is coupled to the second terminals of the first switch, and, when receiving electric power from said one of the network cables through the first switch and the first interface, rectifies the electric power received by the third rectifier to generate a first rectified voltage. The fourth rectifier is coupled to the second terminals of the second switch, and, when receiving electric power from said another one of the network cables through the second switch and the second interface, rectifies the electric power received by the fourth rectifier to generate a second rectified voltage. The switch controller is coupled to the third and fourth rectifiers to receive the first and second rectified voltages, and is further coupled to the control terminals of the first and second switches. The switch controller generates the first and second control signals for receipt by the control terminals of the first and second switches and an enable signal based on the first and second rectified voltages. The PD controller is coupled to the common node of the first and second rectifiers to receive the input voltage, and is to output the input voltage to serve as a supply voltage that supplies electric power required for operation of the PoE device. The third switch has a first terminal that is coupled to the common node of the first and second rectifiers, a second terminal, and a control terminal that is coupled to the switch controller to receive the enable signal. Based on the enable signal, the third switch transitions between a conduction state, where the first and second terminals thereof are coupled to each other, and a non-conduction state, where the first and second terminals thereof are not coupled to each other. The PSE controller is coupled to the second terminal of the third switch and the third terminals of the first and second switches, is to receive the input voltage from the common node of the first and second rectifiers through the third switch, and is to output the input voltage to serve as an output voltage for receipt by the third terminals of each of the first and second switches. The switch controller, when determining that the PoE device receives electric power from said one of the network cables, generates the first and second control signals and the enable signal in such a way that the first switch, the second switch and the third switch respectively stay in the first state, the second state and the conduction state, so that the output voltage is generated, and supplies electric power to said another one of the network cables through the second switch and the second interface. The switch controller, when determining that the PoE device receives electric power from said another one of the network cables, generates the first and second control signals and the enable signal in such a way that the first switch, the second switch and the third switch respectively stay in the second state, the first state and the conduction state, so that the output voltage is generated, and supplies electric power to said one of the network cables through the first switch and the first interface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
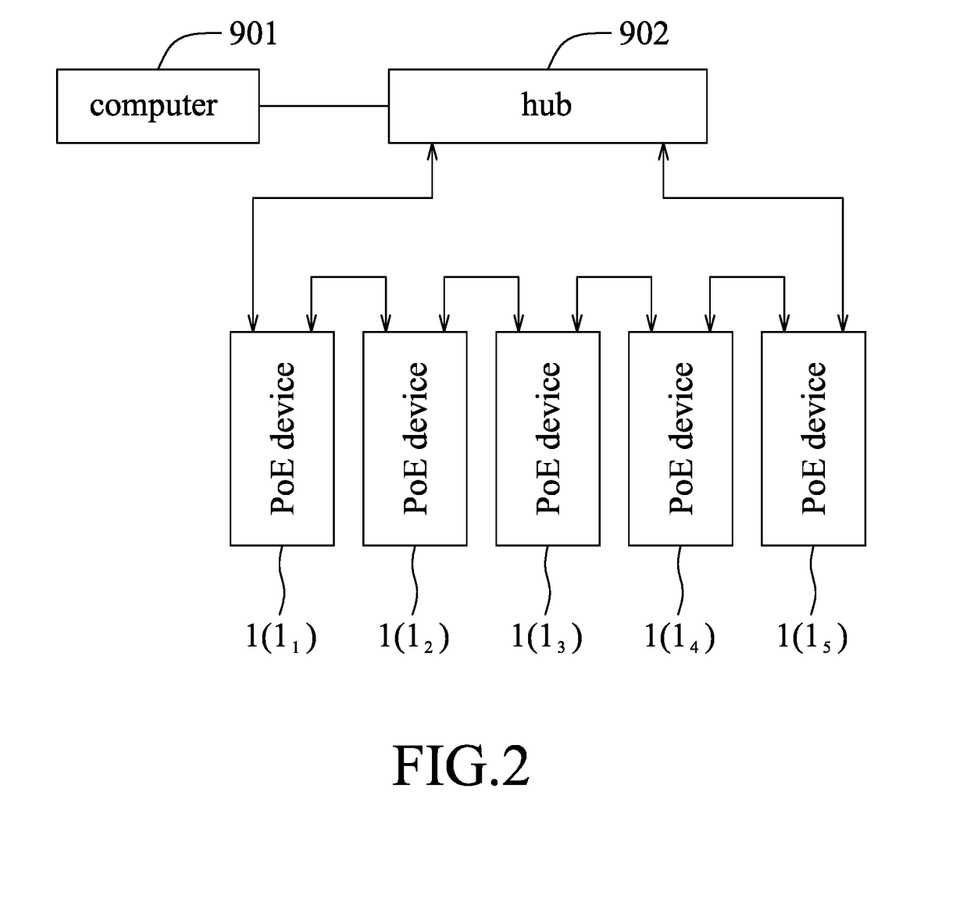
FIG. 2 is a block diagram illustrating an embodiment of a power-over-Ethernet (PoE) system according to the disclosure.

Referring to FIG. 2, an embodiment of a power-over-Ethernet (PoE) system according to the disclosure is operatively associated with a computer 901, and includes a plurality of PoE devices 1 and a hub 902 that are coupled in a ring configuration through a plurality of network cables. Each of the network cables includes four twisted pairs (not shown), and is capable of carrying electric power and data. In this embodiment, for illustration purposes, there are five PoE devices 1 that include a first PoE device $1_1$, a second PoE device $1_2$, a third PoE device $1_3$, a fourth PoE device $1_4$ and a fifth PoE device $1_5$. The hub 902 supports PoE, and includes two connectors (not shown) that are respectively coupled to two of the network cables. Each of the connectors of the hub 902 is an eight-position eight-contact (8P8C) connector, which is also referred to as an RJ45 connector. The hub 902 provides electric power to at least one of said two of the network cables through at least one of the connectors of the hub 902.

Figure 3:
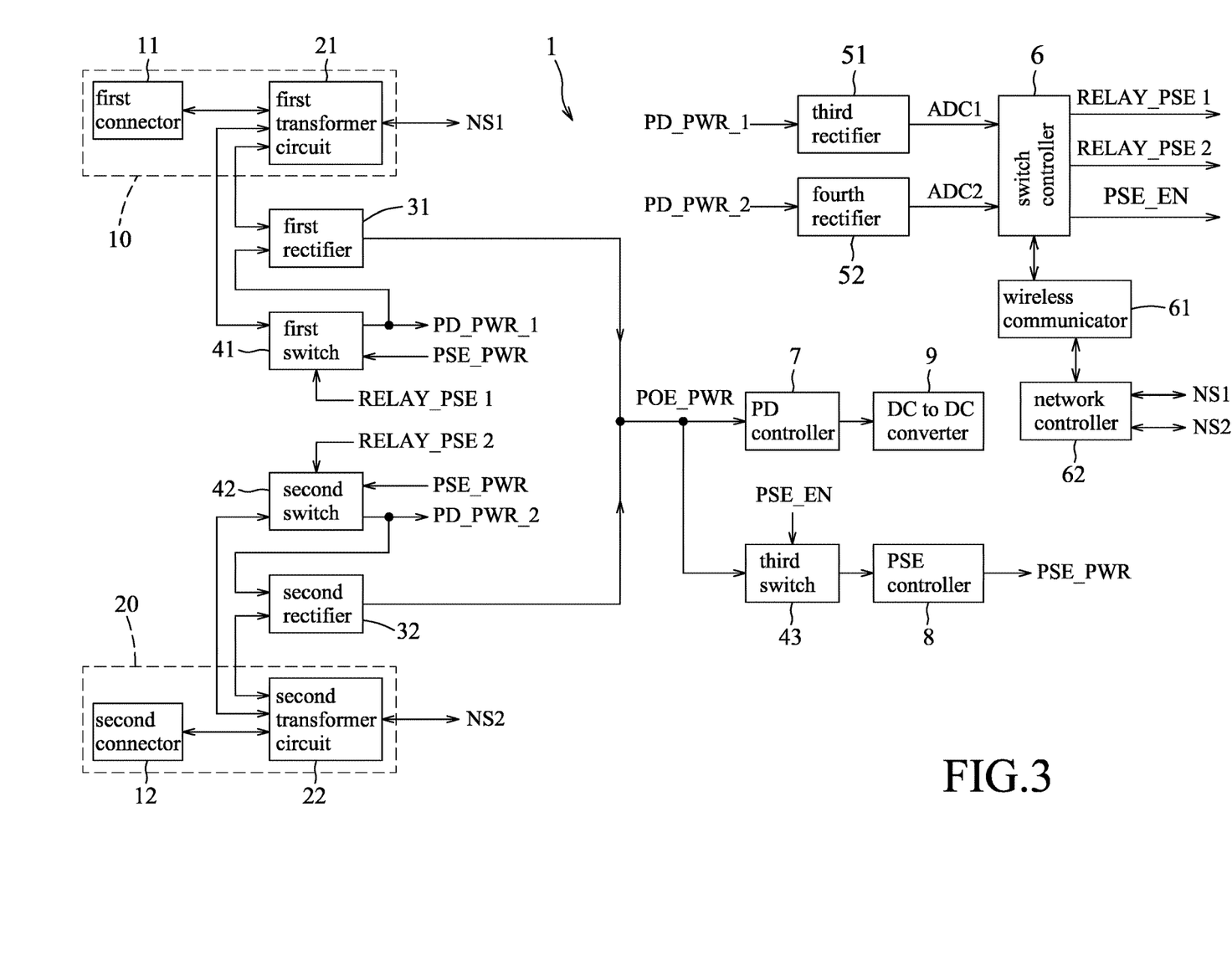
FIG. 3 is a block diagram illustrating each of multiple PoE devices of the embodiment.
Figure 4:
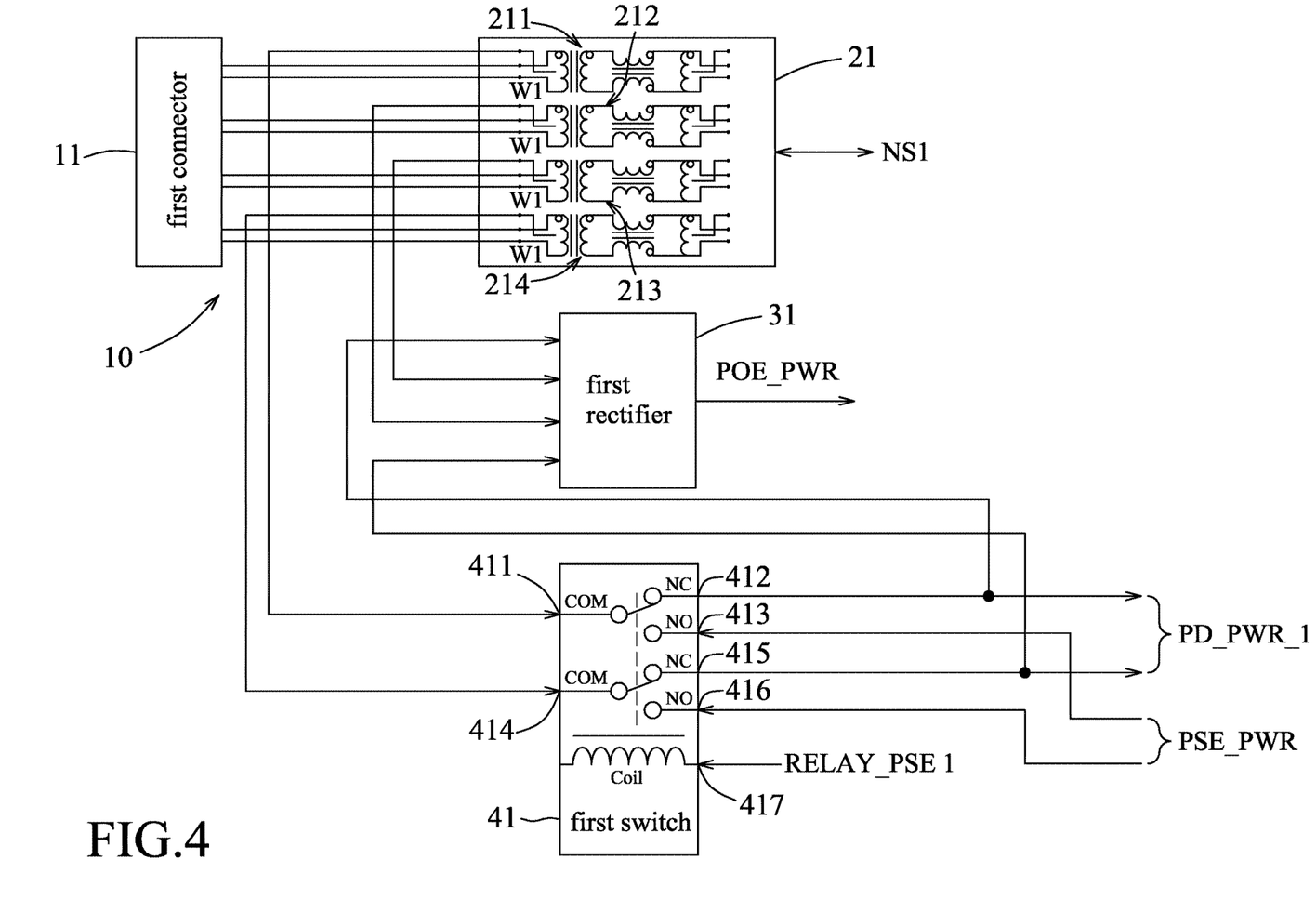
FIGS. 4 and 5 are circuit block diagrams illustrating some details of each of the PoE devices.
Figure 5:
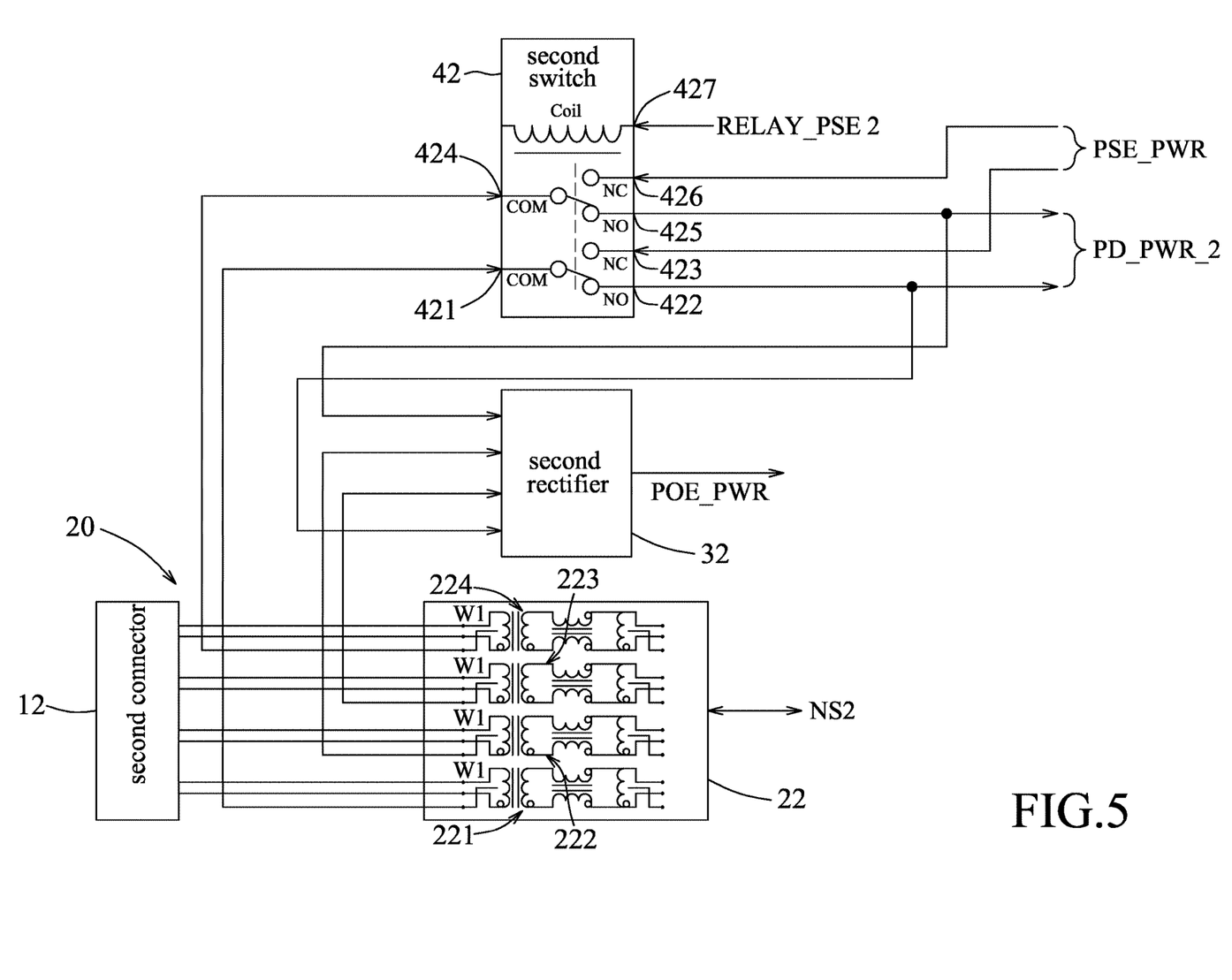

Referring to FIGS. 3 to 5, each of the PoE devices 1 supports PoE, and includes a first interface 10, a second interface 20, a first switch 41, a second switch 42, a first rectifier 31, a second rectifier 32, a third rectifier 51, a fourth rectifier 52, a switch controller 6, a powered device (PD) controller 7, a third switch 43, a power sourcing equipment (PSE) controller 8, a direct current to direct current (DC to DC) converter 9, a wireless communicator 61 and a network controller 62. The first interface 10 includes a first connector 11 and a first transformer circuit 21. The second interface 20 includes a second connector 12 and a second transformer circuit 22. Each of the first and second connectors 11, 12 is an 8P8C connector. The first and second connectors 11, 12 are respectively coupled to one and another one of the network cables. Said one and another one of the network cables are hereinafter respectively referred to as said one network cable and said another network cable for the sake of simplicity.

The first and second transformer circuits 21, 22 are respectively coupled to the first and second connectors 11, 12. For each of the first and second interfaces 10, 20, the transformer circuit 21/22 is an Ethernet transformer circuit, and includes four transformers (211-214 or 221-224) and other elements; and each of the transformers (211-214 or 221-224) includes a primary winding (W1) that has two end terminals and a central terminal, and other elements. The end terminals of the primary winding (W1) of each of the transformers 211-214 of the first transformer circuit 21 are coupled to a respective one of the twisted pairs of said one network cable through the first connector 11. The end terminals of the primary winding (W1) of each of the transformers 221-224 of the second transformer circuit 22 are coupled to a respective one of the twisted pairs of said another network cable through the second connector 12. The network controller 62 is coupled to the first and second transformer circuits 21, 22, uses a first network signal (NS1) to transmit data to and receive data from said one network cable through the first transformer circuit 21 and the first connector 11, and uses a second network signal (NS2) to transmit data to and receive data from said another network cable through the second transformer circuit 22 and the second connector 12.

The first switch 41 has a plurality of first terminals (e.g., two first terminals 411, 414) that are respectively coupled to the central terminals of the primary windings (W1) of several of the transformers (e.g., two of the transformers 211-214) of the first transformer circuit 21, a plurality of second terminals (e.g., two second terminals 412, 415), a plurality of third terminals (e.g., two terminals 413, 416), and a control terminal 417 that is to receive a first control signal (RELAY_PSE1). The second switch 42 has a plurality of first terminals (e.g., two first terminals 421, 424) that are respectively coupled to the central terminals of the primary windings (W1) of several of the transformers (e.g., two of the transformers 221-224) of the second transformer circuit 22, a plurality of second terminals (e.g., two second terminals 422, 425), a plurality of third terminals (e.g., two third terminals 423, 426), and a control terminal 427 that is to receive a second control signal (RELAY_PSE2). Each of the first and second switches 41, 42 normally stays in a first state where the first terminals 411/421, 414/424 thereof are respectively coupled to the second terminals 412/422, 415/425 thereof, and, when being actuated by the corresponding one of the first and second control signals (RELAY_PSE1, RELAY_PSE2), stays in a second state where the first terminals 411/421, 414/424 thereof are respectively coupled to the third terminals 413/423, 416/426 thereof. In this embodiment, each of the first and second switches 41, 42 is a double-pole double-throw (DPDT) relay that has two common terminals (COM) respectively serving as the first terminals 411/421, 414/424 of the switch 41/42, two normally closed terminals (NC) respectively serving as the second terminals 412/422, 415/425 of the switch 41/42, two normally open terminals (NO) respectively serving as the third terminals 413/423, 416/426 of the switch 41/42, and a control terminal serving as the control terminal 417 of the switch 41/42.

The first rectifier 31 is coupled to the central terminals of the primary windings (W1) of the other two of the transformers 211-214 of the first transformer circuit 21 and the second terminals 412, 415 of the first switch 41. The second rectifier 32 is coupled to the central terminals of the primary windings (W1) of the other two of the transformers 221-224 of the second transformer circuit 22, the second terminals 422, 425 of the second switch 42, and the first rectifier 31. The first rectifier 31, when receiving electric power from said one network cable through the first transformer circuit 21 and the first connector 11 or through the first switch 41, the first transformer circuit 21 and the first connector 11, rectifies the electric power received by the first rectifier 31, and the second rectifier 32, when receiving electric power from said another network cable through the second transformer circuit 22 and the second connector 12 or through the second switch 42, the second transformer circuit 22 and the second connector 12, rectifies the electric power received by the second rectifier 32, so that an input voltage (POE_PWR) is provided at a common node of the first and second rectifiers 31, 32.

The third rectifier 51 is coupled to the second terminals 412, 415 of the first switch 41, and, when receiving electric power from said one network cable through the first switch 41, the first transformer circuit 21 and the first connector 11, rectifies the electric power received by the third rectifier 51 to generate a first rectified voltage (ADC1). The fourth rectifier 52 is coupled to the second terminals 422, 425 of the second switch 42, and, when receiving electric power from said another network cable through the second switch 42, the second transformer circuit 22 and the second connector 12, rectifies the electric power received by the fourth rectifier 52 to generate a second rectified voltage (ADC2).

The PD controller 7 is coupled to the common node of the first and second rectifiers 31, 32 to receive the input voltage (POE_PWR), and is to output the input voltage (POE_PWR) to serve as a supply voltage. The DC to DC converter 9 is coupled to the PD controller 7 to receive the supply voltage, and performs DC-to-DC conversion on the supply voltage to generate at least one converted voltage that supplies electric power required for operation of the PoE device 1.

When the PoE device 1 is not powered through any one of said one and another network cables, none of the first and second control signals (RELAY_PSE1, RELAY_PSE2) is generated, and both of the first and second switches 41, 42 are in the first state. Thereafter, when the PoE device 1 is powered by a power sourcing equipment (i.e., the hub 902 (see FIG. 2) or another one of the PoE devices 1 (see FIG. 2)) through said one network cable, the first rectifier 31 receives electric power from said one network cable through the first transformer circuit 21 and the first connector 11 or through the first switch 41, the first transformer circuit 21 and the first connector 11, and rectifies the electric power received by the first rectifier 31 to generate the input voltage (POE_PWR), the PD controller 7 receives the input voltage (POE_PWR) from the first rectifier 31, handshakes with a PSE controller of the power sourcing equipment, and outputs the input voltage (POE_PWR) to serve as the supply voltage, and the DC to DC converter 9 receives the supply voltage from the PD controller 7, and converts the supply voltage into the converted voltage to supply electric power required for operation of the PoE device 1; alternatively, when the PoE device 1 is powered by a power sourcing equipment (i.e., the hub 902 (see FIG. 2) or another one of the PoE devices 1 (see FIG. 2)) through said another network cable, the second rectifier 32 receives electric power from said another network cable through the second transformer circuit 22 and the second connector 12 or through the second switch 42, the second transformer circuit 22 and the second connector 12, and rectifies the electric power received by the second rectifier 32 to generate the input voltage (POE_PWR), the PD controller 7 receives the input voltage (POE_PWR) from the second rectifier 32, handshakes with a PSE controller of the power sourcing equipment, and outputs the input voltage (POE_PWR) to serve as the supply voltage, and the DC to DC converter 9 receives the supply voltage from the PD controller 7, and converts the supply voltage into the converted voltage to supply electric power required for operation of the PoE device 1. It should be noted that, in either case, the electric power supplied by the power sourcing equipment to the PoE device 1 is less before the handshaking, as compared to after the handshaking.

The third switch 43 has a first terminal that is coupled to the common node of the first and second rectifiers 31, 32, a second terminal, and a control terminal that is to receive an enable signal (PSE_EN). Based on the enable signal (PSE_EN), the third switch 43 transitions between a conduction state, where the first and second terminals thereof are coupled to each other, and a non-conduction state, where the first and second terminals thereof are not coupled to each other.

The PSE controller 8 is coupled to the second terminal of the third switch 43 and the third terminals 413, 416, 423, 426 of the first and second switches 41, 42, is to receive the input voltage (POE_PWR) from the common node of the first and second rectifiers 31, 32 through the third switch 43, and is to output the input voltage (POE_PWR) to serve as an output voltage (PSE_PWR) for receipt by the third terminals 413/423, 416/426 of each of the first and second switches 41, 42.

The switch controller 6 (e.g., a microcontroller unit (MCU)) is coupled to the third and fourth rectifiers 51, 52 to receive the first and second rectified voltages (ADC1, ADC2), and is further coupled to the control terminal 417 of the first switch 41, the control terminal 427 of the second switch 42 and the control terminal of the third switch 43. The switch controller 6 generates the first control signal (RELAY_PSE1), the second control signal (RELAY_PSE2) and the enable signal (PSE_EN) for receipt by the control terminal 417 of the first switch 41, the control terminal 427 of the second switch 42 and the control terminal of the third switch 43 based on the first and second rectified voltages (ADC1, ADC2).

The switch controller 6, when receiving the first rectified voltage (ADC1) from the third rectifier 51, determines that the PoE device 1 receives electric power from said one network cable. The switch controller 6, when determining that the PoE device 1 receives electric power from said one network cable, generates the first control signal (RELAY_PSE1), the second control signal (RELAY_PSE2) and the enable signal (PSE_EN) in such a way that the first switch 41, the second switch 42 and the third switch 43 respectively stay in the first state, the second state and the conduction state, so that the PSE controller 8 receives the input voltage (POE_PWR) from the first rectifier 31 through the third switch 43, and outputs the input voltage (POE_PWR) to serve as the output voltage (PSE_PWR) so as to supply electric power to said another network cable through the second switch 42, the second transformer circuit 22 and the second connector 12. If a powered device (i.e., another one of the PoE devices 1 (see FIG. 2)) receives electric power from said another network cable and a PD controller of the powered device handshakes with the PSE controller 8, the PSE controller 8 increases an amount of the electric power supplied thereby.

The switch controller 6, when receiving the second rectified voltage (ADC2) from the fourth rectifier 52, determines that the PoE device 1 receives electric power from said another network cable. The switch controller 6, when determining that the PoE device 1 receives electric power from said another network cable, generates the first control signal (RELAY_PSE1), the second control signal (RELAY_PSE2) and the enable signal (PSE_EN) in such a way that the first switch 41, the second switch 42 and the third switch 43 respectively stay in the second state, the first state and the conduction state, so that the PSE controller 8 receives the input voltage (POE_PWR) from the second rectifier 32 through the third switch 43, and outputs the input voltage (POE_PWR) to serve as the output voltage (PSE_PWR) so as to supply electric power to said one network cable through the first switch 41, the first transformer circuit 21 and the first connector 11. If a powered device (i.e., another one of the PoE devices 1 (see FIG. 2)) receives electric power from said one network cable and a PD controller of the powered device handshakes with the PSE controller 8, the PSE controller 8 increases an amount of the electric power supplied thereby.

Referring to FIGS. 2 and 3, to be specific, one of the first and second connectors 11, 12 of the first PoE device $1_1$ is coupled to one of the connectors of the hub 902 through a first one of the network cables; one of the first and second connectors 11, 12 of the second PoE device $1_2$ is coupled to the other one of the first and second connectors 11, 12 of the first PoE device $1_1$ through a second one of the network cables; one of the first and second connectors 11, 12 of the third PoE device $1_3$ is coupled to the other one of the first and second connectors 11, 12 of the second PoE device $1_2$ through a third one of the network cables; one of the first and second connectors 11, 12 of the fourth PoE device $1_4$ is coupled to the other one of the first and second connectors 11, 12 of the third PoE device $1_3$ through a fourth one of the network cables; one of the first and second connectors 11, 12 of the fifth PoE device $1_5$ is coupled to the other one of the first and second connectors 11, 12 of the fourth PoE device $1_4$ through a fifth one of the network cables; and the other one of the first and second connectors 11, 12 of the fifth PoE device $1_5$ is coupled to the other one of the connectors of the hub 902 through a sixth one of the network cables. When the hub 902 provides electric power only to the first PoE device $1_1$, the first PoE device $1_1$ provides electric power to the second PoE device $1_2$, the second PoE device $1_2$ provides electric power to the third PoE device $1_3$, the third PoE device $1_3$ provides electric power to the fourth PoE device $1_4$, and the fourth PoE device $1_4$ provides electric power to the fifth PoE device $1_5$. When the hub 902 provides electric power only to the fifth PoE device $1_5$, the fifth PoE device $1_5$ provides electric power to the fourth PoE device $1_4$, the fourth PoE device $1_4$ provides electric power to the third PoE device $1_3$, the third PoE device $1_3$ provides electric power to the second PoE device $1_2$, and the second PoE device $1_2$ provides electric power to the first PoE device $1_1$. When the hub 902 provides electric power to both of the first and fifth PoE devices $1_1$, $1_5$, the first and fifth PoE devices $1_1$, $1_5$ respectively provide electric power to the second and fourth PoE devices $1_2$, $1_4$, and the second and fourth PoE devices $1_2$, $1_4$ provide electric power to the third PoE device $1_3$.

Optionally, each of the PoE devices 1 further includes an image capturing module (not shown) so as to serve as an Internet Protocol (IP) camera; and the computer 901 cooperates with the hub 902 and the PoE devices 1 to form a security monitoring system, and receives images captured by each of the PoE devices 1 through the hub 902.

For each of the PoE devices 1, the wireless communicator 61 is coupled to the switch controller 6 and the network controller 62. When the switch controller 6 determines that the PoE device 1 is unable to establish a wired network link through one of the first and second interfaces 10, 20 (i.e., the network controller 62 being unable to transmit data to and receive data from said one network cable through the first interface 10, or being unable to transmit data to and receive data from said another network cable through the second interface 20), the switch controller 6 enables the wireless communicator 61, and the PoE device 1 serves as a wireless host node that is able to establish a wireless network link through the enabled wireless communicator 61. When the switch controller 6 determines that the PoE device 1 is unable to establish a wired network link through either of the first and second interfaces 10, 20 (i.e., the network controller 62 being unable to transmit data to and receive data from said one network cable through the first interface 10, and being unable to transmit data to and receive data from said another network cable through the second interface 20), the switch controller 6 enables the wireless communicator 61, and the PoE device 1 establishes a wireless network link to a wireless host node through the wireless communicator 61 (i.e., the network controller 62 being able to transmit data to and receive data from the wireless host node through the wireless communicator 61).

In an example where the second and third PoE devices $1_2$, $1_3$ are unable to establish a wired network link therebetween, and where the third and fourth PoE devices $1_3$, $1_4$ are unable to establish a wired network link therebetween, the PoE system operates as described below. First, each of the second and fourth PoE devices $1_2$, $1_4$ serves as a wireless host node. Then, the third PoE device $1_3$ establishes a wireless network link with one of the second and fourth PoE devices $1_2$, $1_4$ that has a stronger signal strength (i.e., one of the second and fourth PoE devices $1_2$, $1_4$ a signal received from which has a stronger strength). Finally, the other one of the second and fourth PoE devices $1_2$, $1_4$ ceases to serve as the wireless host node, and establishes a wireless network link with said one of the second and fourth PoE devices $1_2$, $1_4$.

In view of the above, by virtue of each of the PoE devices 1 receiving electric power through one of the first and second connectors 11, 12 and supplying electric power through the other one of the first and second connectors 11, 12, when the hub 902 and the PoE devices 1 are coupled in the ring configuration, each of the PoE devices 1 can be directly or indirectly powered by the hub 902, rather than being powered by a respective adapter. Therefore, it is not necessary to purchase adapters and wire the adapters respectively to the PoE devices 1.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A power-over-Ethernet (PoE) device comprising:
  a first interface and a second interface adapted to be respectively coupled to a first network cable and a second network cable;
  a first switch having a plurality of first terminals that are coupled to said first interface, a plurality of second terminals, a plurality of third terminals, and a control terminal that is to receive a first control signal;
  a second switch having a plurality of first terminals that are coupled to said second interface, a plurality of second terminals, a plurality of third terminals, and a control terminal that is to receive a second control signal;
  each of said first and second switches normally staying in a first state where said first terminals thereof are respectively coupled to said second terminals thereof, and, when being actuated by the corresponding one of the first and second control signals, staying in a second state where said first terminals thereof are respectively coupled to said third terminals thereof;
  a first rectifier coupled to said first interface and said second terminals of said first switch;
  a second rectifier coupled to said second interface, said second terminals of said second switch, and said first rectifier;
  said first rectifier, when receiving electric power from the first network cable through said first interface or through said first switch and said first interface, rectifying the electric power received by said first rectifier, and said second rectifier, when receiving electric power from the second network cable through said second interface or through said second switch and said second interface, rectifying the electric power received by said second rectifier, so that an input voltage is provided at a common node of said first and second rectifiers;
  a third rectifier coupled to said second terminals of said first switch, and, when receiving electric power from the first network cable through said first switch and said first interface, rectifying the electric power received by said third rectifier to generate a first rectified voltage;
  a fourth rectifier coupled to said second terminals of said second switch, and, when receiving electric power from the second network cable through said second switch and said second interface, rectifying the electric power received by said fourth rectifier to generate a second rectified voltage;
  a switch controller coupled to said third and fourth rectifiers to receive the first and second rectified voltages, and further coupled to said control terminals of said first and second switches; said switch controller generating the first and second control signals for receipt by said control terminals of said first and second switches and an enable signal based on the first and second rectified voltages;
  a powered device (PD) controller coupled to said common node of said first and second rectifiers to receive the input voltage, and to output the input voltage to serve as a supply voltage that supplies electric power required for operation of said PoE device;
  a third switch having a first terminal that is coupled to said common node of said first and second rectifiers, a second terminal, and a control terminal that is coupled to said switch controller to receive the enable signal; based on the enable signal, said third switch transitioning between a conduction state, where said first and second terminals thereof are coupled to each other, and a non-conduction state, where said first and second terminals thereof are not coupled to each other; and
  a power sourcing equipment (PSE) controller coupled to said second terminal of said third switch and said third terminals of said first and second switches, to receive the input voltage from said common node of said first and second rectifiers through said third switch, and to output the input voltage to serve as an output voltage for receipt by said third terminals of each of said first and second switches;

wherein said switch controller, when determining that said power device receives electric power from the first network cable, generates the first and second control signals and the enable signal in such a way that said first switch, said second switch and said third switch respectively stay in the first state, the second state and the conduction state, so that the output voltage is generated, and supplies electric power to the second network cable through said second switch and said second interface;

wherein said switch controller, when determining that said power device receives electric power from the second network cable, generates the first and second control signals and the enable signal in such a way that said first switch, said second switch and said third switch respectively stay in the second state, the first state and the conduction state, so that the output voltage is generated, and supplies electric power to the first network cable through said first switch and said first interface.

2. The PoE device of claim 1, wherein each of said first and second interfaces includes:
a connector adapted to be coupled to the corresponding one of the first and second network cables; and
a transformer circuit coupled to said connector, said first terminals of the corresponding one of said first and second switches, and the corresponding one of said first and second rectifiers.

3. The PoE device of claim 2, wherein for each of said first and second interfaces:
said transformer circuit includes four transformers;
each of said transformers includes a primary winding that has two end terminals and a central terminal;
said end terminals of said primary windings of said transformers are coupled to said connector;
said central terminals of said primary windings of two of said transformers are respectively coupled to said first terminals of the corresponding one of said first and second switches; and
said central terminals of said primary windings of the other two of said transformers are coupled to the corresponding one of said first and second rectifiers.

4. The PoE device of claim 1, further comprising:
a wireless communicator coupled to said switch controller;
wherein said switch controller, when determining that said PoE device is unable to establish a network link through at least one of said first and second interfaces, enables said wireless communicator such that said PoE device is able to establish a network link through said wireless communicator.

5. A power-over-Ethernet (PoE) system comprising:
a plurality of PoE devices and a hub that are coupled in a ring configuration through a plurality of network cables;
said hub being coupled to two of the network cables, and providing electric power to at least one of said two of the network cables;
each of said PoE devices including
a first interface and a second interface respectively coupled to one and another one of the network cables;

a first switch having a plurality of first terminals that are coupled to said first interface, a plurality of second terminals, a plurality of third terminals, and a control terminal that is to receive a first control signal;
a second switch having a plurality of first terminals that are coupled to said second interface, a plurality of second terminals, a plurality of third terminals, and a control terminal that is to receive a second control signal;
each of said first and second switches normally staying in a first state where said first terminals thereof are respectively coupled to said second terminals thereof, and, when being actuated by the corresponding one of the first and second control signals, staying in a second state where said first terminals thereof are respectively coupled to said third terminals thereof;
a first rectifier coupled to said first interface and said second terminals of said first switch;
a second rectifier coupled to said second interface, said second terminals of said second switch, and said first rectifier;
said first rectifier, when receiving electric power from said one of the network cables through said first interface or through said first switch and said first interface, rectifying the electric power received by said first rectifier, and said second rectifier, when receiving electric power from said another one of the network cables through said second interface or through said second switch and said second interface, rectifying the electric power received by said second rectifier, so that an input voltage is provided at a common node of said first and second rectifiers;
a third rectifier coupled to said second terminals of said first switch, and, when receiving electric power from said one of the network cables through said first switch and said first interface, rectifying the electric power received by said third rectifier to generate a first rectified voltage;
a fourth rectifier coupled to said second terminals of said second switch, and, when receiving electric power from said another one of the network cables through said second switch and said second interface, rectifying the electric power received by said fourth rectifier to generate a second rectified voltage;
a switch controller coupled to said third and fourth rectifiers to receive the first and second rectified voltages, and further coupled to said control terminals of said first and second switches; said switch controller generating the first and second control signals for receipt by said control terminals of said first and second switches and an enable signal based on the first and second rectified voltages;
a powered device (PD) controller coupled to said common node of said first and second rectifiers to receive the input voltage, and to output the input voltage to serve as a supply voltage that supplies electric power required for operation of said PoE device;
a third switch having a first terminal that is coupled to said common node of said first and second rectifiers, a second terminal, and a control terminal that is coupled to said switch controller to receive the enable signal; based on the enable signal, said third switch transitioning between a conduction state, where said first and second terminals thereof are coupled to each other, and a non-conduction state, where said first and second terminals thereof are not coupled to each other; and a power sourcing equipment (PSE) controller coupled to said second terminal of said third switch and said third terminals of said first and second switches, to receive the input voltage from said common node of said first and second rectifiers through said third switch, and to output the input voltage to serve as an output voltage for receipt by said third terminals of each of said first and second switches;

wherein said switch controller, when determining that said power device receives electric power from said one of the network cables, generates the first and second control signals and the enable signal in such a way that said first switch, said second switch and said third switch respectively stay in the first state, the second state and the conduction state, so that the output voltage is generated, and supplies electric power to said another one of the network cables through said second switch and said second interface;

wherein said switch controller, when determining that said power device receives electric power from said another one of the network cables, generates the first and second control signals and the enable signal in such a way that said first switch, said second switch and said third switch respectively stay in the second state, the first state and the conduction state, so that the output voltage is generated, and supplies electric power to said one of the network cables through said first switch and said first interface.

6. The PoE system of claim 5, wherein each of said first and second interfaces of any one of said PoE devices includes:
a connector adapted to be coupled to the corresponding one of the network cables; and a transformer circuit coupled to said connector, said first terminals of the corresponding one of said first and second switches, and the corresponding one of said first and second rectifiers.

7. The PoE system of claim 6, wherein for each of said first and second interfaces of any one of said PoE devices:
said transformer circuit includes four transformers;
each of said transformers includes a primary winding that has two end terminals and a central terminal;
said end terminals of said primary windings of said transformers are coupled to said connector;
said central terminals of said primary windings of two of said transformers are respectively coupled to said first terminals of the corresponding one of said first and second switches; and
said central terminals of said primary windings of the other two of said transformers are coupled to the corresponding one of said first and second rectifiers.

8. The PoE system of claim 5, wherein:
each of said PoE devices further includes a wireless communicator that is coupled to said switch controller; and
for each of said PoE devices,
when said switch controller determines that said PoE device is unable to establish a network link through one of said first and second interfaces, said switch controller enables said wireless communicator, and said PoE device serves as a wireless host node that is able to establish a network link through said wireless communicator, and
when said switch controller determines that said PoE device is unable to establish a network link through two of said first and second interfaces, said switch controller enables said wireless communicator, and said PoE device establishes a network link to a wireless host node through said wireless communicator.

* * * * *